(12) United States Patent
Holman, IV et al.

(10) Patent No.: US 8,630,089 B2
(45) Date of Patent: Jan. 14, 2014

(54) RESILIENT SWIVEL COUPLING MECHANISM

(75) Inventors: Martin Holman, IV, Sunrise, FL (US); Bruce Ivanik, Sunrise, FL (US); Douglas Moskowitz, Sunrise, FL (US)

(73) Assignee: BlackBerry Limited, Waterloo Ontario (CA)

( * ) Notice: Subject to any disclaimer, the term of this patent is extended or adjusted under 35 U.S.C. 154(b) by 309 days.

(21) Appl. No.: 13/011,232

(22) Filed: Jan. 21, 2011

(65) Prior Publication Data

US 2012/0188688 A1   Jul. 26, 2012

(51) Int. Cl.
*G06F 1/16* (2006.01)
*H05K 5/00* (2006.01)
*H05K 7/00* (2006.01)
*H04M 1/00* (2006.01)

(52) U.S. Cl.
USPC .............. 361/679.56; 455/575.3; 455/575.4

(58) Field of Classification Search
USPC ............ 361/679.26–27, 679.55–56, 679.58; 455/575.1–575.4
See application file for complete search history.

(56) References Cited

U.S. PATENT DOCUMENTS

| | | | |
|---|---|---|---|
| 5,485,517 A * | 1/1996 | Gray | 379/433.13 |
| 6,766,182 B2 | 7/2004 | Janninck et al. | |
| 6,912,122 B2 * | 6/2005 | Chen et al. | 361/679.27 |
| 7,050,767 B2 | 5/2006 | Hickey et al. | |
| 7,117,564 B2 | 10/2006 | Jeong | |
| 7,159,833 B2 | 1/2007 | Kato | |
| 7,162,030 B2 | 1/2007 | Bell et al. | |
| 7,168,135 B2 | 1/2007 | Jung et al. | |
| 7,184,805 B2 | 2/2007 | Cho et al. | |
| 7,346,375 B2 | 3/2008 | Sato et al. | |
| 7,376,450 B2 | 5/2008 | Chen | |
| 7,419,099 B2 | 9/2008 | Lee et al. | |
| 7,440,782 B2 | 10/2008 | Cha | |
| 7,469,449 B2 | 12/2008 | Hsu | |
| 7,492,893 B2 | 2/2009 | Ahn et al. | |
| 7,496,194 B2 | 2/2009 | Jeun | |
| 7,496,389 B2 | 2/2009 | Cho et al. | |
| 7,515,405 B2 * | 4/2009 | Lev et al. | 361/679.55 |
| 7,529,571 B2 | 5/2009 | Byun et al. | |
| 7,565,185 B2 | 7/2009 | Kang et al. | |
| 7,566,033 B2 * | 7/2009 | Schwager et al. | 248/125.9 |
| 7,577,466 B2 | 8/2009 | Kim | |

(Continued)

FOREIGN PATENT DOCUMENTS

EP   1615406      1/2006
EP   1615406 A1   1/2006

OTHER PUBLICATIONS

European Search Report dated May 31, 2011 for EP11151757.

(Continued)

*Primary Examiner* — Adrian S Wilson
(74) *Attorney, Agent, or Firm* — Jon A. Gibbons; Fleit Gibbons Gutman Bongini & Bianco PL

(57) ABSTRACT

A resilient coupling mechanism assembly includes a resilient coupling mechanism. The resilient coupling mechanism includes a resilient member. A first member is coupled to the resilient member. A second member is coupled to the first member. The first member comprises a first cavity. A vertical member is disposed within the first cavity. A second member is coupled to the first member. The second member comprises a second cavity configured to receive the vertical member.

24 Claims, 11 Drawing Sheets

(56) References Cited

U.S. PATENT DOCUMENTS

| | | |
|---|---|---|
| 7,580,734 B2 | 8/2009 | Ahn et al. |
| 7,595,980 B2 * | 9/2009 | Wang et al. ............ 361/679.27 |
| 7,610,067 B2 | 10/2009 | Cho et al. |
| 7,624,477 B2 | 12/2009 | Chien et al. |
| 7,725,987 B2 | 6/2010 | Duan et al. |
| 7,778,673 B2 | 8/2010 | Zhu |
| 7,797,795 B2 | 9/2010 | Maatta et al. |
| 7,800,893 B2 * | 9/2010 | Tracy et al. ............ 361/679.27 |
| 7,903,400 B1 * | 3/2011 | Chen et al. ............ 361/679.27 |
| 8,000,094 B2 * | 8/2011 | Wang et al. ............ 361/679.26 |
| 2004/0203527 A1 | 10/2004 | Matsumoto |
| 2005/0128695 A1 * | 6/2005 | Han ............ 361/683 |
| 2005/0137000 A1 | 6/2005 | Toh et al. |
| 2006/0210060 A1 | 9/2006 | Ishikawa et al. |
| 2009/0040712 A1 * | 2/2009 | Hoshi et al. ............ 361/685 |

OTHER PUBLICATIONS

Canadian Office Action dated Jun. 25, 2013 for Application No. 2,762,257.

* cited by examiner

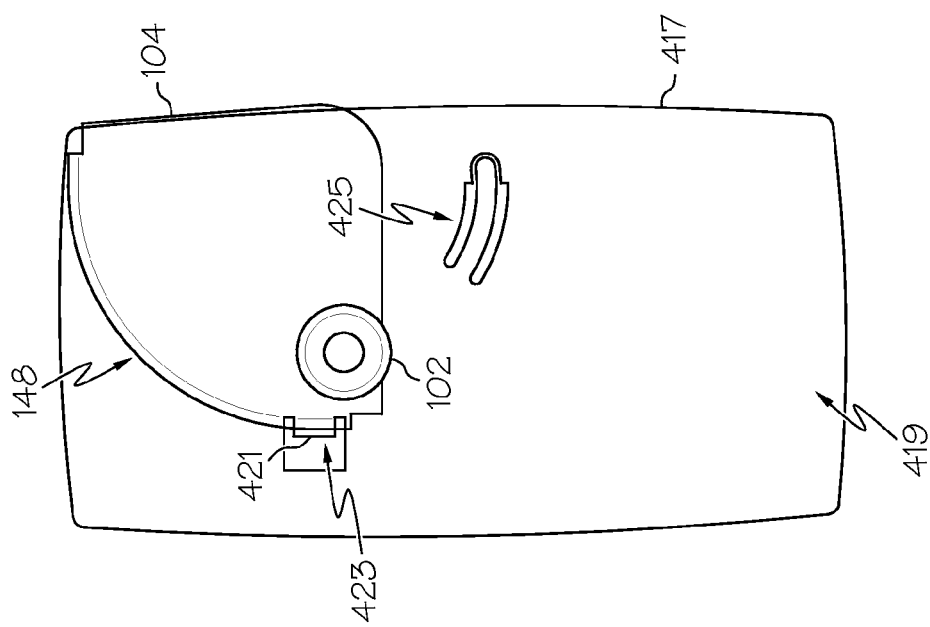

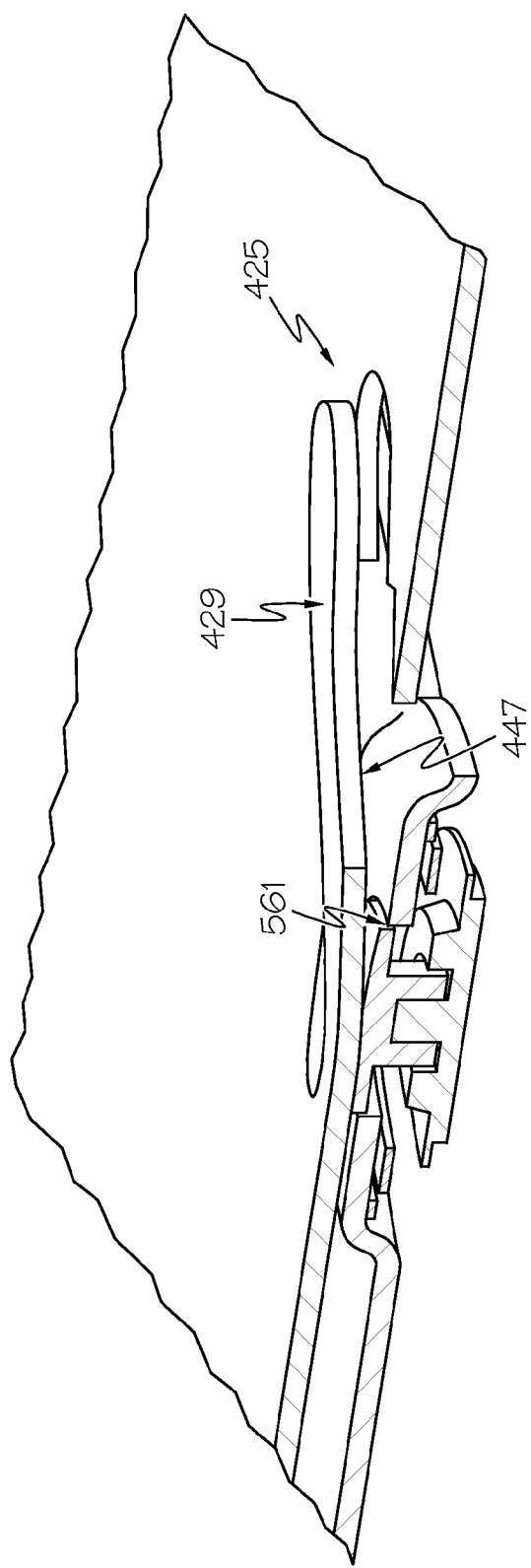

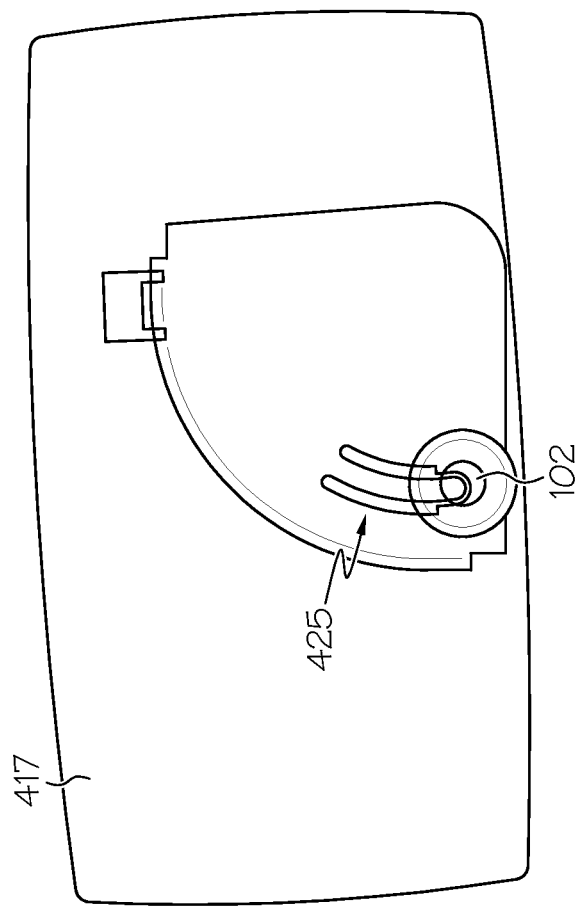

RESILIENT SWIVEL COUPLING MECHANISM

FIELD OF THE DISCLOSURE

The present disclosure generally relates to mechanical rotatable coupling mechanisms (or bushings) for portable electronic devices, and more particularly to a swivel mechanism for use within a portable electronic device.

BACKGROUND

Many portable electronic devices now comprise displays that can be rotated with respect to the keyboard or vice versa. For example, these devices usually allow the display to be rotated 90 degrees with respect to the keyboard. This extended configuration exposes the device and the extended portion, in particular, to increased damage as a result of an impact force such as those experienced by dropping the device, bumping the device, etc. The coupling mechanisms implemented on the device for allowing these extended configurations generally do not provide any type of protection from these impact forces.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which.

DETAILED DESCRIPTION

Figure 1:
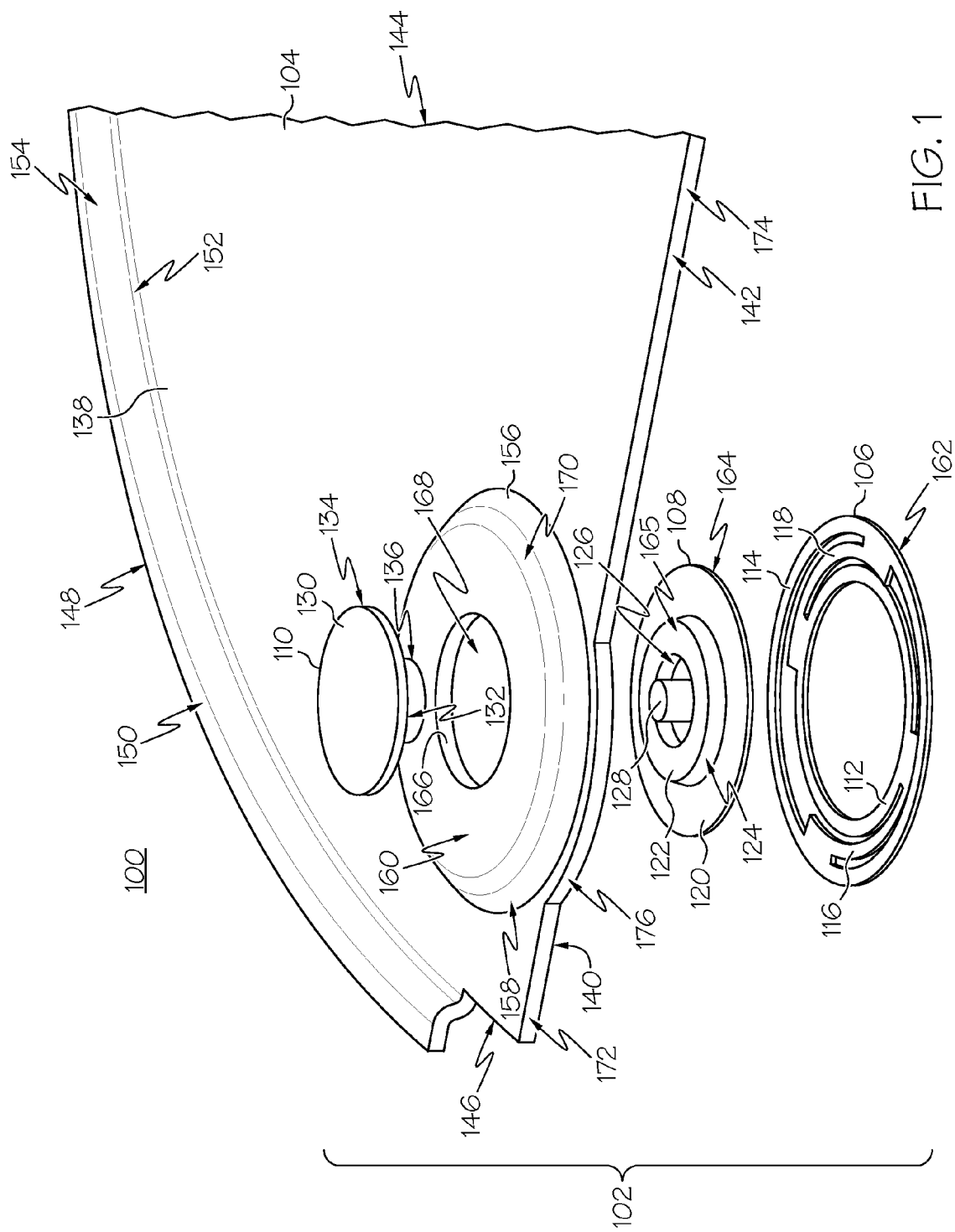
FIG. 1 is an exploded view of a coupling mechanism assembly comprising a resilient coupling mechanism according to one example.

As required, detailed embodiments are disclosed herein; however, it is to be understood that the disclosed embodiments are merely examples and that the systems and methods described below can be embodied in various forms. Therefore, specific structural and functional details disclosed herein are not to be interpreted as limiting, but merely as a basis for the claims and as a representative basis for teaching one skilled in the art to variously employ the disclosed subject matter in virtually any appropriately detailed structure and function. Further, the terms and phrases used herein are not intended to be limiting, but rather, to provide an understandable description.

The terms "a" or "an", as used herein, are defined as one or more than one. The term plurality, as used herein, is defined as two or more than two. The term another, as used herein, is defined as at least a second or more. The terms "including" and "having" as used herein, are defined as comprising (i.e. open language). The term "coupled" as used herein, is defined as "connected" although not necessarily directly, and not necessarily mechanically.

The term "wireless communication device" is intended to broadly cover many different types of devices that can wirelessly receive signals, and in most cases can wirelessly transmit signals, and may also operate in a wireless communication system. For example, and not for any limitation, a wireless communication device can include any one or a combination of the following: a two-way radio, a cellular telephone, a mobile phone, a smartphone, a two-way pager, a wireless messaging device, a laptop/computer, a personal digital assistant, and other similar devices.

Various materials or combinations of materials can be used to construct the rotatable coupling mechanism (or bushing) and its components. For example, materials such as plastics (e.g., polyoxymethylene), metals, metal alloys, composites, ceramics, and other inorganic or organic materials or combinations thereof may be used.

Described below is a resilient coupling mechanism assembly that comprises a resilient coupling mechanism. The resilient coupling mechanism comprises a resilient member that is substantially circular. The resilient member comprises at least an inner portion that is coupled to an outer portion. The outer portion circumscribes the inner portion. A first member comprises a first portion and a second portion. The second portion extends from a top surface of the first portion. The first portion comprises a diameter that is larger than a diameter of the second portion. A bottom surface of the first portion is coupled to a top surface of the inner portion of the resilient member. The first member comprises a cavity extending from a top surface of the second portion to at least a top surface of the first portion. The first member further comprises a vertical member disposed within the cavity. A second member is coupled to the first member. The second member comprises a first portion and a second portion. The first and second portions are substantially circular. The first portion comprises a diameter that is larger than a diameter of the second portion. The second portion extends from a bottom surface of the first portion. The second portion of the second member comprises a cavity that receives the vertical member of the first member.

The resilient coupling mechanism provides an additional coupling point for at least a first portion of a portable electronic device. This additional coupling point provides additional support and rigidity to the portable electronic device. For example, when this first portion of the device is in an extended position, the moment of a force experienced by the first portion when the device is dropped, bumped, etc. is decreased by the resilient coupling mechanism. Therefore, less stress and force are exerted on the components of the device.

Resilient Coupling Mechanism

FIG. 1 is an exploded view of a resilient coupling mechanism assembly 100 according to one example. The resilient coupling mechanism assembly 100 comprises a resilient coupling mechanism 102 and a base plate 104. The resilient coupling mechanism 102 comprises a resilient member (or clamp spring) 106, a first member (or clamp screw) 108, and a second member (or clamp nut) 110. The resilient member (or clamp spring) 106, in one example, is substantially circular and can be any resilient object that stores mechanical energy when compressed such as, but not limited to, a spring. In this example, the resilient member (or clamp spring) 106 comprises an inner portion (or inner ring) 112 and an outer portion (or outer ring) 114 that circumscribes the inner portion (or inner ring) 112. Stated differently, the outer portion (or outer ring) 114 comprises a larger diameter than the inner portion (or inner ring) 112. One or more intermediate openings 116, 118 that are disposed between the inner portion (or inner ring) 112 and the outer portion (or outer ring) 114 form a passage therebetween. Also, the inner portion (or inner ring) 112 and the outer portion (or outer ring) 114 of the resilient member (or clamp spring) 106 are able to move independent of each other. It should be noted that other configurations of the resilient member (or clamp spring) 106 are also applicable as well.

The first member (or clamp screw) 108 is also substantially circular and forms a base for the second member (or clamp nut) 110. The first member (or clamp screw) 108 comprises a first (lower) portion/region 120 and a second (upper) portion/region 122 that are coupled to each other via a chamfered region 124. The first and second portions 120, 122 are substantially circular. The first portion/region 120 comprises a diameter that is larger than the diameter of the second portion/region 122. The second portion/region 122 is elevated with respect to the first portion/region 120 via the chamfered region 124. The first member (or clamp screw) 108 also defines a cavity 126 that extends at least through a top surface 165 of the second portion/region 122 to at least a top surface 285 (FIG. 2) of the first portion/region 120. The cavity 126 circumscribes a vertical member 128 that is disposed within the cavity 126 and extends above the second portion/region 122 of the first member (or clamp screw) 108. However, the vertical member 128 is not required to extend above the second portion/region 122. In one embodiment, the vertical member 128 is configured to receive the second member (or clamp nut) 110. In this example, the vertical member 128 is substantially cylindrical, but other configurations are applicable as well.

The second member (or clamp nut) 110 comprises a first portion/region 130 that is substantially circular and a second portion/region 132 that is substantially cylindrical. The second portion/region 132 extends in a vertical direction from a bottom surface 134 of the first portion/region 130. In this example, the first portion/region 130 comprises a diameter that is larger than a diameter of the second portion/region 132. The second portion/region 132 defines a cavity 136 that is configured to receive the vertical member 128 of the first member (or clamp screw) 108.

Figure 8:
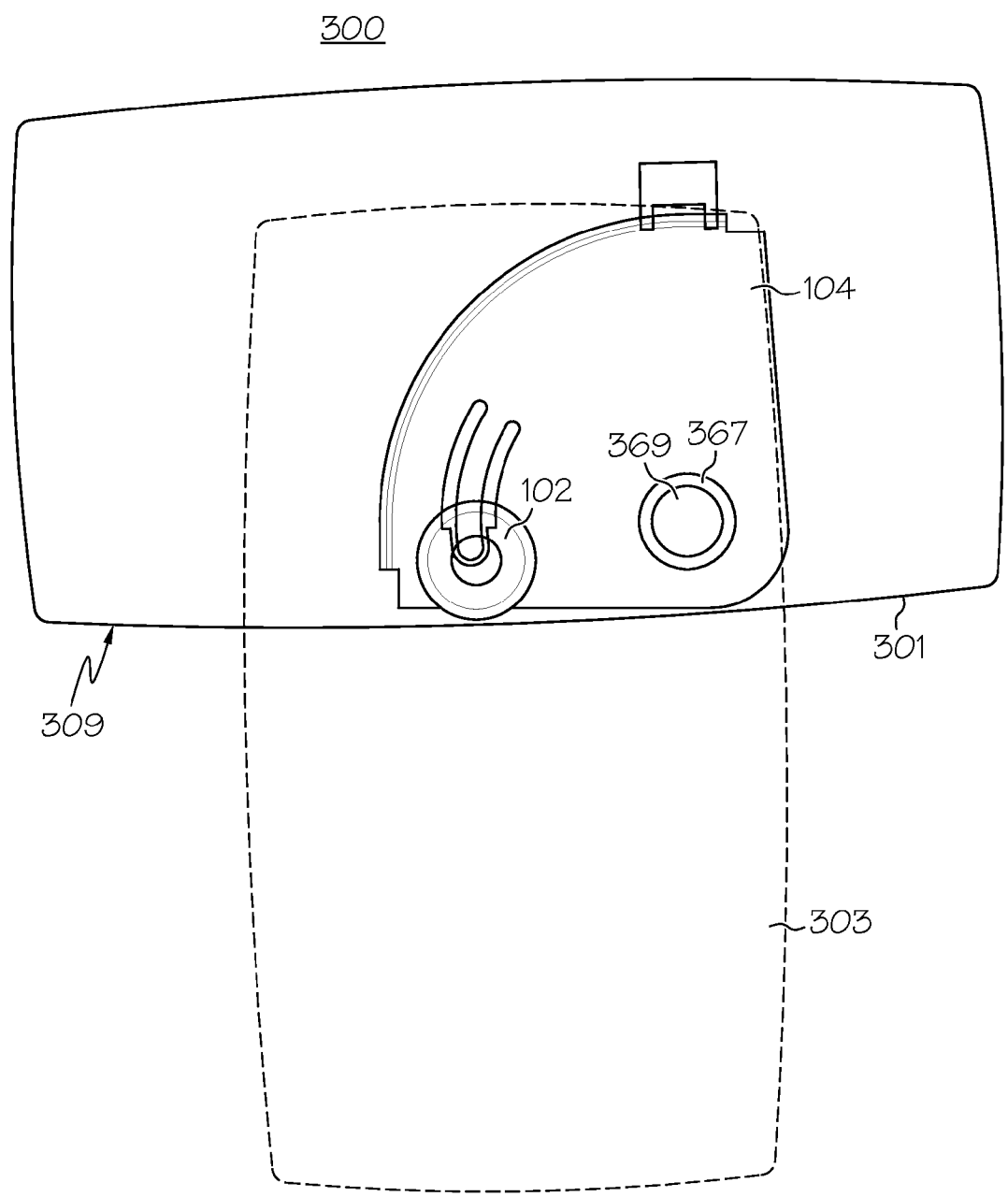
FIG. 8 is a top perspective view of the coupling mechanism assembly of FIG. 4 in an extended position.

The base plate 104 comprises a rotatable coupling mechanism (or bushing) 305 (See FIG. 3 and FIG. 8) that allows a first portion 301, such as a display, of a portable electronic device 300 to be rotated with respect to a second portion, 303, such as a keyboard, of the device 300. For example, as can be seen in FIG. 8 a first portion 367 of the rotatable coupling mechanism (or bushing) 305 is coupled to the base plate 104 and a second portion 369 of the rotatable coupling mechanism (or bushing) 305 is coupled to a back portion (or bottom surface) 309 of the first portion 301 of the device 300. In this example, the first portion 367 is fixed to the base plate 104 while the second portion 369 is able to rotate about the first portion, thereby allowing the first portion 301 of the device 300 to rotate about the second portion 303 of the device 300.

The base plate 104 also comprises a top portion 138 and a bottom portion 140. The base plate 104 also comprises a first side 142, a second side 144, and a third side 146 that is disposed between the first and second side 144. The third side 146 comprises an arced configuration that defines the degree of movement of the first portion 301 of the device 300 with respect to the second portion 303 of the device 300. At least one region of the third side 146 comprises a protruding portion (or guide rail) 148 that extends beyond the third side 146. The protruding portion (or guide rail) 148 comprises an upper portion 150 that is coupled to a lower portion 152 via a chamfered region 154. The upper portion 150 is elevated with respect to the lower portion 152 and the top portion of the base plate 104. The upper portion 150 also extends farther from the third side 146 than the lower portion 152. The lower portion 150, in the example of FIG. 1, comprises a concave configuration. This configuration of the protruding portion (or guide rail) 148 discussed above allows an area of the first portion 301 of the portable electronic device 300 to rest on the protruding portion (or guide rail) 148 and act as a track for this area to slide along. Stated differently, the protruding portion (or guide rail) 148 acts as a transitioning guide for the first portion 301 of the portable electronic device 300.

The base plate 104 also comprises an embossed region 156 that extends from the surface of the bottom portion 140 to above the surface of the top portion 138. For example, FIG. 1 shows that the embossed region 156 comprises a side portion 158 that extends above the surface of the top portion 138. The embossed region 156 comprises a top portion 160 that meets the side portion 158 and that is elevated above the surface of the top portion 138 of the base plate 104. The embossed region 156, in this example, is substantially circular and is dimensioned to receive the resilient coupling mechanism 102 therein. For example, the embossed region 156 has a diameter that is larger than a diameter of the resilient member (or clamp spring) 106 and a height that is greater than a height of the resilient coupling mechanism 102. This configuration allows the resilient coupling mechanism 102 to reside within the embossed region 156 such that a bottom surface 162 of the resilient member (or clamp spring) 106 and a bottom surface 164 of the first (lower) portion 120 of the first member (or clamp screw) 108 are above, or at least flush, with the bottom portion 140 of the base plate 104.

The top portion 160 of the embossed region 156 comprises an inner wall 166 that circumscribes a first cavity 168. The first cavity 168 comprises a diameter that is smaller than a diameter of the resilient member (or clamp spring) 106 and the first member (or clamp screw) 108 of the resilient coupling mechanism 102, but that is larger than a diameter of the first portion/region 130 and second portion/region 132 of the second member (or clamp nut) 110 of the mechanism 102. This allows a the first portion/region 130 of the second member (or clamp nut) 110 and the second portion/region 132 of the second member (or clamp nut) 110 to pass through the cavity 168 and be elevated above the embossed region 156, as shown in FIG. 2.

In the example of FIG. 1, the embossed region 156 is disposed substantially near the location where the first side 142 and the third side 146 of the base plate 104 meet. Also, in this example, an outer portion 170 of the embossed region 156 extends beyond a first region 172 and a second region 174 of the first side 142. Therefore, the first side 142 comprises an arced region 176 between the first region 172 and the second region 174 that circumscribes the outer portion 170 of the embossed region 156.

Figure 2:
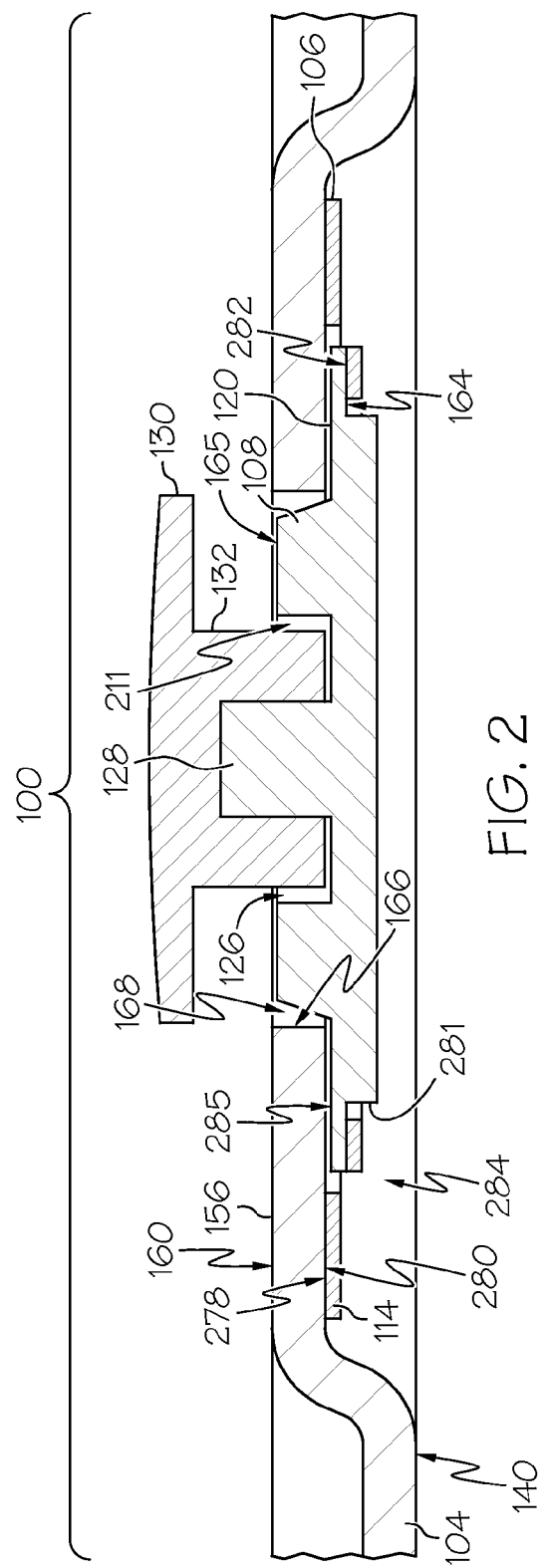
FIG. 2 is a cross-sectional view of the coupling mechanism assembly comprising the resilient coupling mechanism of FIG. 1 according to one example.

Turning now to FIG. 2, FIG. 2 shows a cross-sectional view of the resilient coupling mechanism 102 and the base plate 104. As can be seen in FIG. 2, the vertical member 128 of the first member (or clamp screw) 108 is disposed within the second portion/region 132 of the second member (or clamp nut) 110 and a portion 211 (e.g., a lower region) of the second member (or clamp nut) is disposed within the cavity 126 of the first member (or clamp screw) 108. In this example, the second member (or clamp nut) 110 is removably coupled to the vertical member 128. For example, each of the vertical member 128 and the second member (or clamp nut) 110 can comprise threaded regions that couple the second member (or clamp nut) 110 to the vertical member 128. However, other coupling mechanisms can be used as well. Also, the second member (or clamp nut) 110 is not required to be removably coupled to the vertical member 128.

FIG. 2 also shows that a top surface 278 of at least the outer portion (or outer ring) 114 of the resilient member (or clamp spring) 106 is mechanically coupled to a bottom surface 280 of the top portion 160 of the embossed region 156 of the base plate 104. The bottom surface 164 of the first (lower) portion/region 120 of the first member (or clamp screw) 108 is mechanically coupled to a top surface 282 of the inner portion (or inner ring) 112 of the resilient member (or clamp spring) 106. It should be noted that the first (lower) portion/region 120 of the first member (or clamp screw) 108 can comprise an extending portion 281 that extends from the bottom surface 164 of the first (lower) portion/region 120 that comprises a smaller diameter than the first (lower) portion/region 120, as shown in FIG. 2.

The configuration of the resilient member (or clamp spring) 106 and the first member (or clamp screw) 108 discussed above allows the first member (or clamp screw) 108 to move in a vertical direction when a vertical force is applied to the first member (or clamp screw) 108. For example, if a downward axial force is applied to the second member (or clamp nut) 110 in a direction towards the base plate 104 this force is translated to the first member (or clamp screw) 108 resulting in the first and second members (or clamp nut) 108, 110 moving in a downward direction towards the base plate 104. As this occurs, at least the inner portion (or inner ring) 112 of the resilient member (or clamp spring) 106 also experiences a downward axial force (in a direction away from the base plate 104) and begins to exert an opposite upward axial force in the upward direction (in a direction towards the base plate 104). This upward axial force results in the first and second member (or clamp nuts) 108, 110 moving in an upward direction (away from the base plate 104) when the upward axial force is greater than the downward axial force.

As can be seen in FIG. 2, a second cavity 284 exists between the bottom surface 280 of the top portion 160 of the embossed region 156 and a bottom portion 140 of the base plate 104. At least a portion of the first member (or clamp screw) 108 is maintained within this second cavity 284 when the resilient coupling mechanism 102 is in an elevated/extended position (e.g., a downward axial force is not being encountered or is less than the upward axial force of the resilient member (or clamp spring) 106), as shown in FIG. 2. As can be seen, the resilient member (or clamp spring) 106 is in a relaxed or partially relaxed state such that the second portion/region 122 of the first member (or clamp screw) 108 extends into the first cavity 168 such that a top surface 285 of the second portion/region 122 is below the bottom surface 280 of the top portion 160 of the embossed region 156. When the resilient coupling mechanism 102 is in a non-extended position (e.g., a downward axial force is being applied to the mechanism 102 that is greater than the opposite force being applied by the resilient member (or clamp spring) 106), at least the upper and lower portions 120, 122 of the first member (or clamp screw) 108 and at least one region of the second portion/region 132 of the second member (or clamp nut) 110 are disposed within the second cavity 284. In this example, at least one region of the first portion/region 130 of the second member (or clamp nut) 110 is disposed within, or is at least flush with, the first cavity 168 between the inner wall 166 of the embossed region 156.

Figure 3:
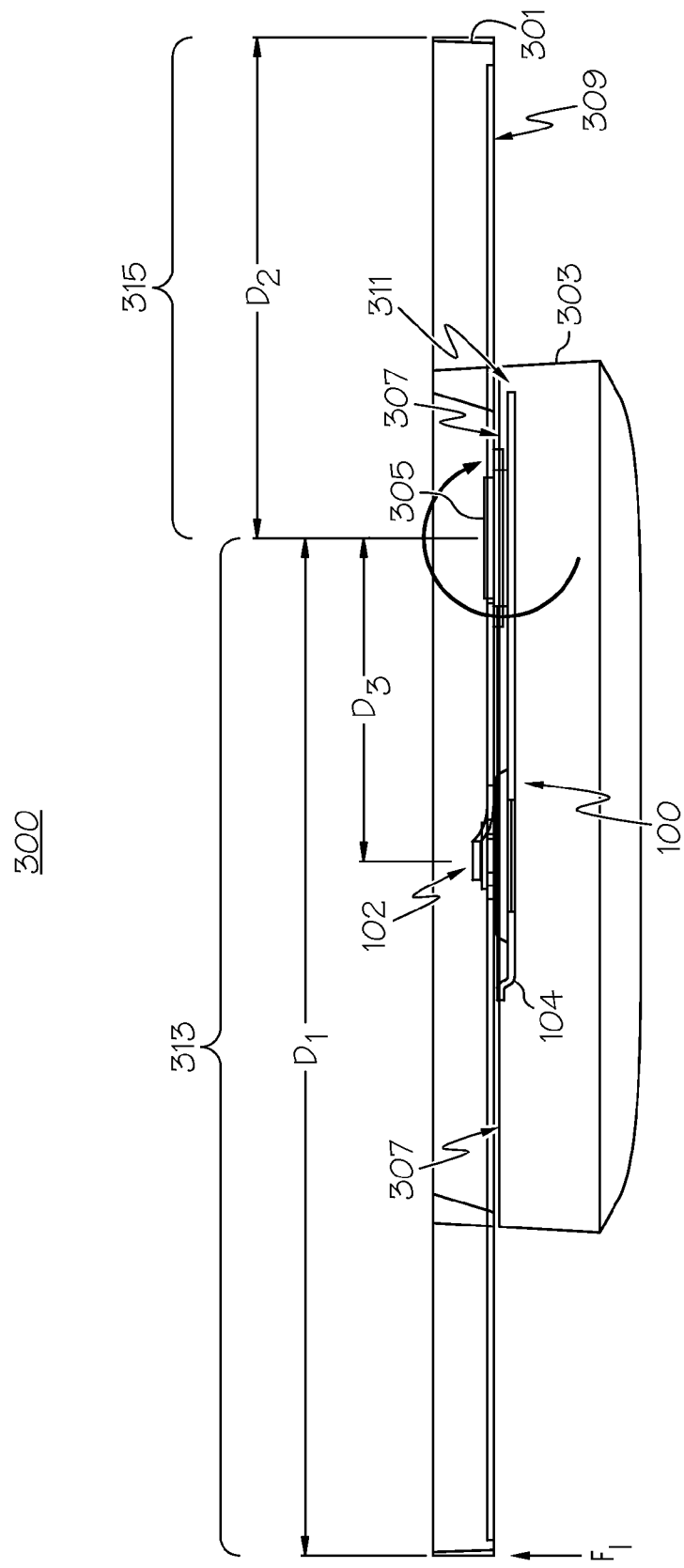
FIG. 3 is a front perspective view of a portable electronic device comprising a first portion in an extended position with respect to a second portion according to one example.

One advantage of the assembly 100 is that the resilient coupling mechanism 102 provides an additional coupling point for at least the first portion 301 of the portable electronic device 300 in addition to the coupling point at the rotatable coupling mechanism (or bushing) 305. This provides additional support and rigidity to the portable electronic device 300. For example, FIG. 3 shows a portable electronic device 300 that comprises a first portion 301 and a second portion 303. The base plate 104 of the resilient coupling mechanism assembly 100 is coupled to a top/front portion 307 of the second portion 303 of the device 300 that faces a bottom/back portion 309 of the first portion 301.

In the example of FIG. 3, the first portion 301 is in an extended position (e.g., rotated to be perpendicular to the second portion 303. This extended configuration causes the device 300 to be more vulnerable to damage when the device 300 is dropped, bumped, etc. For example, because the rotatable coupling mechanism (or bushing) 305 is generally disposed towards a corner area 311 of the second portion 303 there is a greater distance between a first region 313 of the first portion 301 and the rotatable coupling mechanism (or bushing) 305 than the distance between a second region 315 of the first portion 301 and the rotatable coupling mechanism (or bushing) 305. Therefore, the stress and force experienced by at least the rotatable coupling mechanism (or bushing) 305 (and the coupling point between the mechanism 305 and the first portion 301 of the device 300) when an impact occurs at the first region 313 is much greater than the stress and force experienced by the rotatable coupling mechanism (or bushing) 305 when an impact occurs at the second region 315.

For example, the moment of a force can be represented as $M=F \times D$, where M is the moment, F is the force of a drop impact (in this example) and D is the distance between the location of the drop impact on the first portion 301 and the rotatable coupling mechanism (or bushing) 305. As can be seen from FIG. 3, the distance D1 between the first region 313 and the rotatable coupling mechanism (or bushing) 305 is greater than the distance D2 between the second region 315 and the rotatable coupling mechanism (or bushing) 305. Therefore, the moment of a force experienced between the first region 313 and the rotatable coupling mechanism (or bushing) 305 is greater than the moment experienced by the second region 315 and the rotatable coupling mechanism (or bushing) 305. Therefore, it is much easier for damage to occur to the device 300 when a drop impact occurs at the first region 313 than the second region 315.

However, the resilient coupling mechanism 102 of the assembly 100 is configured to be coupled to the first portion 301 of the device 300 when the first portion 301 is in an extended position as shown in FIG. 3. Therefore, the moment of a force discussed above is decreased since the distance $D_1$ is decreased. For example, instead of $M=F \times D1$ for the first region 313, M now equals $M=F \times (D1-D3)$ where D3 is the distance between the resilient coupling mechanism 102 and the rotary coupling mechanism 305. Therefore, the resilient coupling mechanism 102 provides additional support and rigidity to the portable electronic device 300 when the first portion 301 is in an extended position with respect to the second portion 303.

FIGS. 4-6 illustrate a sequence of resilient coupling mechanism 102 being coupled to a rotatable plate 417 of the resilient coupling mechanism assembly 100. In this example, the rotatable plate 417 couples to the back portion 309 of first portion 301 of the portable electronic device 300. For example, a top surface 419 of the rotatable plate 417 abuts the back portion 309 of the first portion 301 of the device 300. It should be noted that the rotatable plate 417 can be formed as part of the bottom portion 309 of the first portion 301 of the device 300 or can be removably coupled thereto. Alternatively, the rotatable plate 417 can be part of the portable electronic device 300 and not the resilient coupling mechanism assembly 100.

Figure 4B:
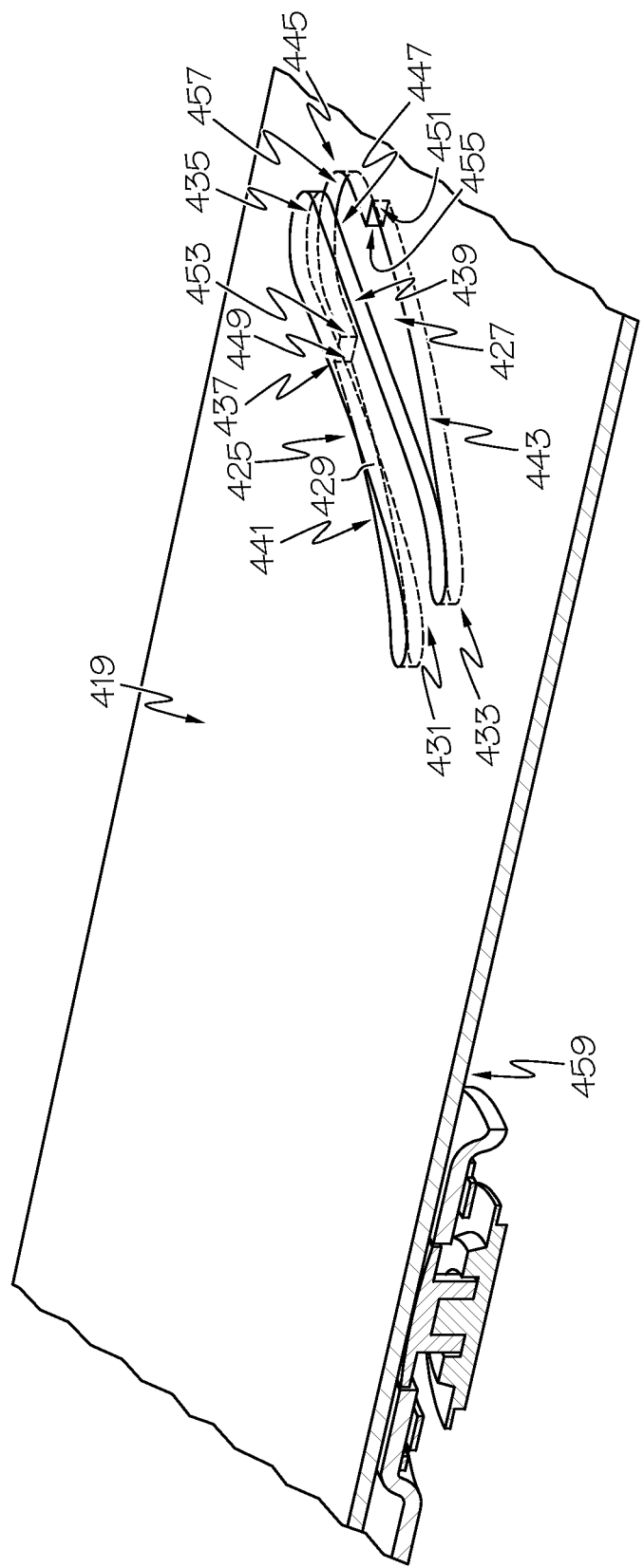
FIGS. 4-6 are top perspective and cross-sectional views of the coupling mechanism assembly of FIG. 1 showing a coupling sequence of the resilient coupling mechanism as a portable electronic device rotatably transitions from a non-extended position to an extended position according to one example.

In particular, FIGS. 4A and 4B show that the rotatable plate 417 of the device 300 is in a non-extended position where the rotatable plate 417 is above and parallel to the second portion 303 of the device 300. As can be seen, in FIG. 4A, the rotatable plate 417 comprises an extending member 421 that extends from the top surface 419 of the rotatable plate 417 through a cavity 423 such that at least one region of the extending member 421 extends below the rotatable plate 417 and over and around the upper portion 150 of the protruding portion (or guide rail) 148 of the base plate 104. The extending member 421 abuts the protruding portion (or guide rail) 148 such that the protruding portion (or guide rail) 148 acts a guide for the extending member 421 when the rotatable plate 417 is transitioning from a non-extended position shown in FIG. 4A to an extended position shown in FIG. 6A.

The rotatable plate 417 comprises a slotted area 425. The slotted area 425 comprises a slot 427 that extends through the top surface 419 of the rotatable plate 417 through a bottom surface of the rotatable plate 417. The slot 427 comprises a curved configuration that substantially matches the angular movement of the rotatable plate 417 with respect to arc of the third side 146 of the base plate 104. This curved configuration is such that as the rotatable plate 417 transitions from the non-extended position to the extended position the resilient coupling mechanism 102 of the base plate 104 encounters the slot 427. It should be noted that the location of the resilient coupling mechanism 102 on the base plate 104 is such that the resilient coupling mechanism 102 encounters the slot 427 during transitioning of the rotatable plate 417 from the non-extended position to the extended position.

FIG. 4B shows that the slotted area 425 also comprises a tongued area 429 that comprises a first end 431 that is disposed at an end region 433 of the slot 427 closest to the resilient coupling mechanism 102 when the rotatable plate 417 is at the non-extended position. The first end 431 is coupled to or is a part of the rotatable plate 417. The tongued area 429 also comprises a second end 435 that is disposed opposite from the first end 431 and is substantially curved. The second end 435 is free and is not coupled to any part of the rotatable plate 417. The tongued area 429 comprises a first side 437 and a second side 439 disposed opposite from the first side 437, where the first and second sides 437, 439 connect the first and second ends 431, 435. The first and second sides 437, 439 comprise a curved configuration that substantially matches the curved configuration of the slotted area 425.

The tongued area 429 is disposed in between a first side portion 441 and a second side portion 443 of the slot 427. The first and second side portions 441, 443 connect the first end region 433 of the slot 427 with a second end region 445 of the slot 427 that is disposed opposite from the first end 433. In one example, the first end 431 of the tongued area 429 and the first end 433 of the slot 427 are the same. The tongued area 429 comprises a width that is smaller than a width between the first and second side portions 441, 443 of the slot 427. This allows the tongued area 429 to reside between the first and second portions 441, 443 without touching the first and second portions 441, 443. The tongued area 429 comprises a graduated slope that increases from the first end 431 to the second end 435 of the tongued area 429. Stated differently, the distance between the bottom surface 447 of the tongued area 429 and the slot 427 increases starting from the first end 431 and moving towards the second end 435. Also, because the first end 431 of the tongued area 429 is coupled to or part of the rotatable plate 417 and the second end 435 of the tongued area 429 is free, the tongued area 429 is able to transition/flex to a position that is above the slot 427, within the slot 427, or any position there between.

A first end 449 of the first side portion 441 and a second end 451 of the second side portion 443 of the slot 427 that are the farthest away from the resilient coupling mechanism 102 when the rotatable plate 417 is at the non-extended position are each coupled to the end 445 of the slot 427 that comprises a curved configuration that extends past these ends, as shown in FIG. 4B. For example, a first inward extending portion 453 extends from the first end 449 towards the second side portion 443 and a second inward extending portion 455 extends from the second end 451 towards the first side portion 441. A substantially curved region 457 connects the first inward extending portion 453 to the second inward extending portion 455. In this example the width between the first side portion 441 and the second side portion 443 of the slot 427 is larger than the diameter of the first portion/region 130 of the second member (or clamp nut) 110. This allows at least the first portion/region 130 of the second member (or clamp nut) 110 to rise above the slot 427. However, the curved end (second end) 445 of the slot 427 comprises a width that is less than the width of the first portion/region 130 of the second member (or clamp nut) 110, but larger than the second portion/region 132 of the second member (or clamp nut) 110.

Figure 5A:
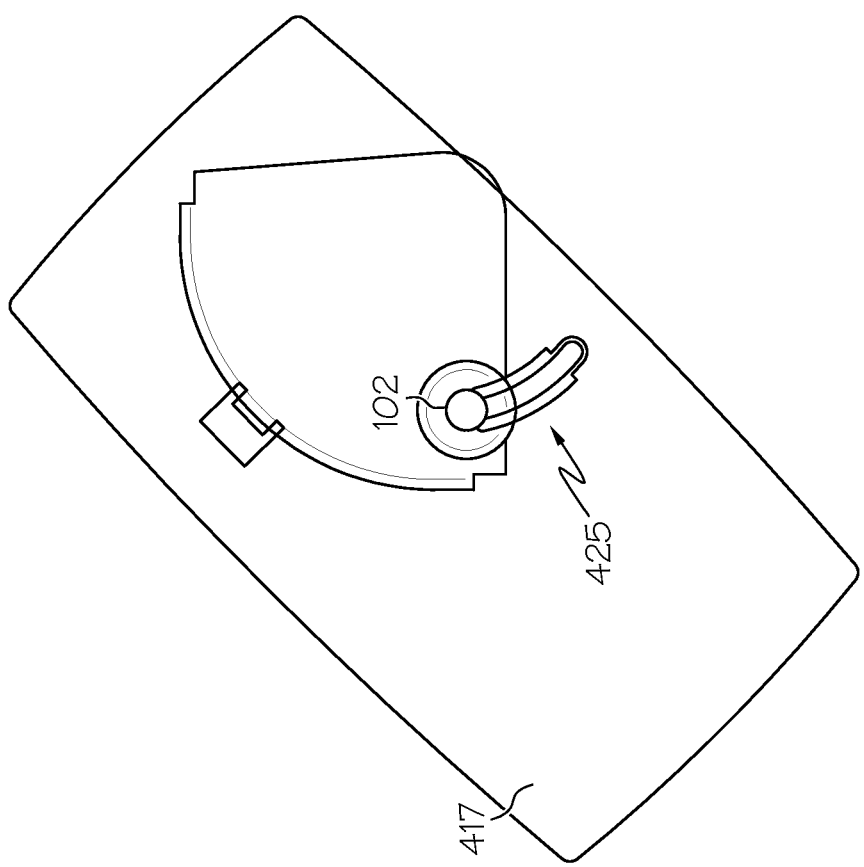

FIG. 4B also shows that the resilient coupling mechanism 102 is in a compressed position when the rotatable plate 417 is in the non-extended position. As can be seen in the cross-sectional view of FIG. 4B, the bottom surface 459 of the rotatable plate 417 is exerting a downward axial force (in a direction toward the resilient member (or clamp spring) 106) on the second member (or clamp nut) 110 which pushes the resilient coupling mechanism 102 axially into the second cavity 284 of the embossed region 156. As the rotatable plate 417 begins to transition from the non-extended position to the extended position the resilient coupling mechanism 102 encounters the slotted area 425 and the top surface 461 of the first portion/region 130 of the second member (or clamp nut) 110 contacts the bottom surface 447 of the tongued area 429, as shown in FIGS. 5A and 5B.

As discussed above, the slot 427 is wider than the second member (or clamp nut) 110 and the tongued area 429 slopes upward (i.e., the slope increases) above the slot 427. Therefore, as the rotatable plate 417 continues to transition to the extended position, the second member (or clamp nut) 110 of the resilient coupling mechanism 102 rises above the slot 427 at a height defined by the tongued area 429. For example, because the tongued area 429 slopes upward (i.e., the slope increases from the first end 431 to the second end 435) the downward axial force (in a direction towards the base plate 104) experienced by the resilient coupling mechanism 102 is decreased, thereby allowing the resilient member (or clamp spring) 106 to return to a less compressed state. This results in the resilient coupling mechanism 102 being pushed upward towards the rotatable plate 417 (at a distance defined by the slope of the tongued area 429) by the resilient member (or clamp spring) 106 (which is moving in a direction towards the base plate 104) as the rotatable plate 417 transitions to the extended position.

Figure 6B:
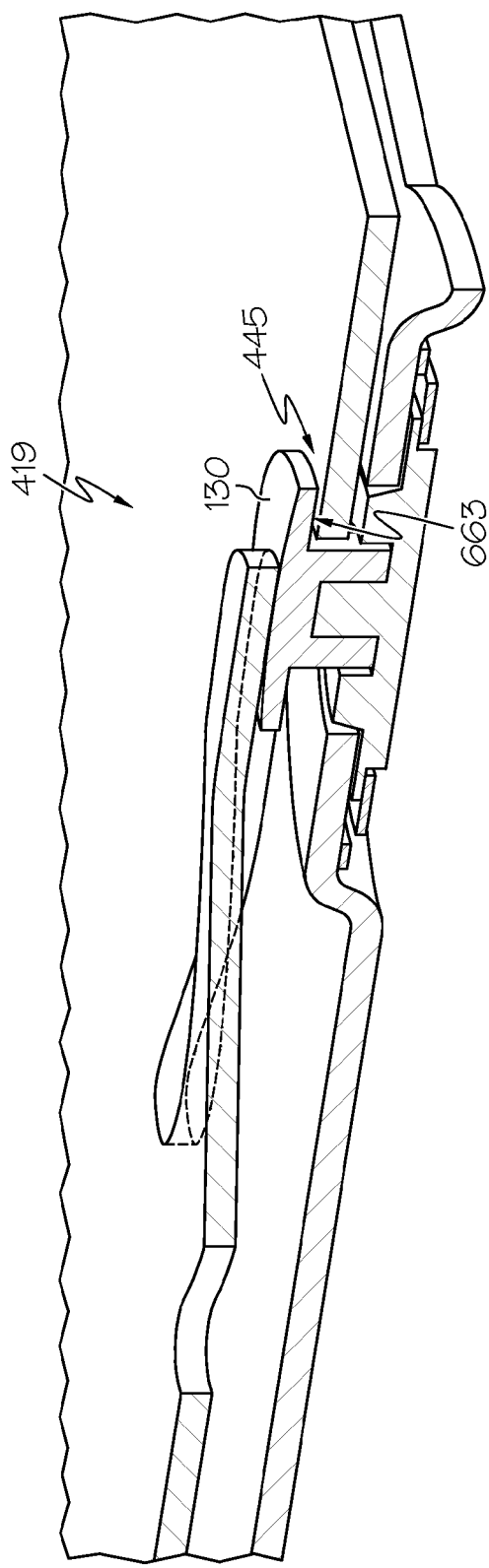
Figure 7:
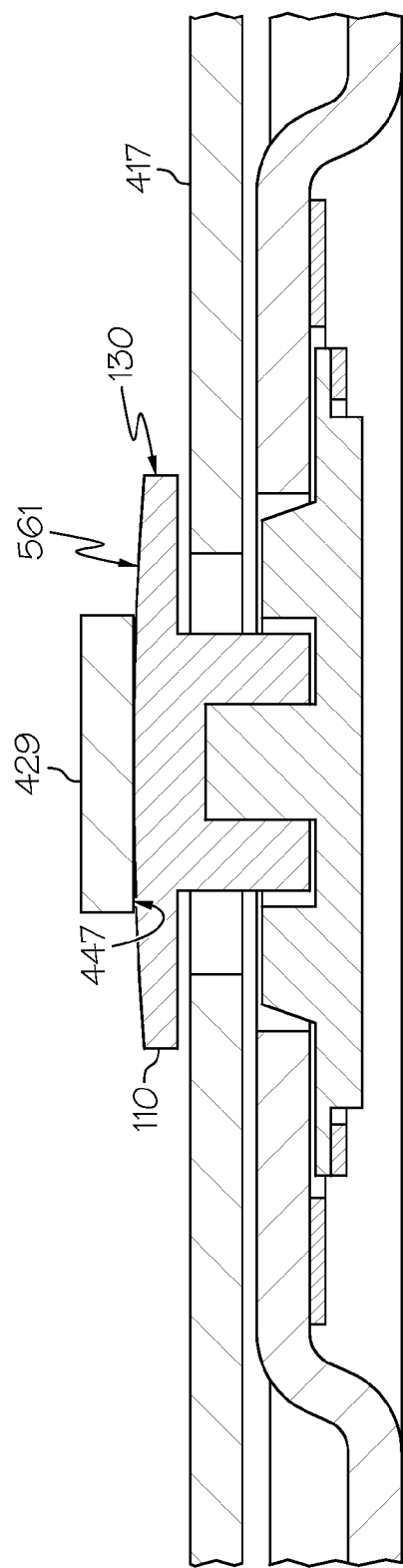
FIG. 7 is a cross-sectional view of the coupling mechanism assembly of FIG. 1 showing the mechanism of FIG. 1 showing the resilient coupling mechanism being coupled to a portion of a portable electronic device when the device is in an extended position according to one example.

When the rotatable plate 417 has transitioned to the extended position the resilient coupling mechanism 102 has been moved a position corresponding to the curved end 445 of the slot 427. Stated differently, the resilient coupling mechanism 102 has been moved to a position where the second member (or clamp nut) 110 has been elevated to a position such that the bottom surface 663 of the first portion/region 130 of the second member (or clamp nut) 110 is above the top surface 419 of the rotatable plate 417 corresponding to the curved region of the second end of the slotted area, as shown in FIGS. 6A and 6B and FIG. 7. It should be noted that because the curved end 445 of the slot 427 comprises a width that is smaller than the diameter of the first portion/region 130 of the second member (or clamp nut) 110, the first portion/region 130 is elevated to a height that is above the curved end 445 of the slot 427 prior to reaching this end 445.

As can be seen in FIGS. 6A and 6B and FIG. 7, the first portion/region 130 of the second member (or clamp nut) 110 extends beyond the curved end 445 of the slot 427 and at least a portion of the bottom surface 663 of the first portion/region 130 abuts the top surface 419 of the rotatable plate 417. Therefore, the first portion/region 130 of the second member (or clamp nut) 110 is retained above the slot 427 when the rotatable plate 417 is in the extended position. This configuration couples the rotatable plate 417 to the resilient coupling mechanism 102, and hence, to the second portion 303 of the device 300.

It should be noted that the first portion/region 130 of the second member (or clamp nut) 110 maintains constant contact with the bottom surface 447 of the tongued area 429 as the rotatable plate 417 transitions between the non-extended and extended positions. For example, FIG. 7 shows that the rotatable plate 417 is in the extended position and the top surface 561 of first portion/region 130 of the second member (or clamp nut) 110 is in contact with the bottom surface 447 of the tongued area 429. As the rotatable plate 417 transitions from the extended position back to the non-extended position the second member (or clamp nut) of the resilient coupling mechanism 102 is moved from the curved end 445 to the wider area of the slot 427. Because the height of the tongued area 429 decreases from the second end 445 of the slot 427 to the first end 433 and the tongued area 429 remains in constant contact with the second member (or clamp nut) 110 of the resilient coupling mechanism 102, the downward axial force (in a direction towards the base plate 104) exerted on the resilient coupling mechanism 102 by the tongued area 429 increases as this transitioning occurs. As this downward axial force is increased, the second member (or clamp nut) 110 and first member (or clamp screw) 108 of the resilient coupling mechanism 102 are pushed downward towards the second cavity 284 of the embossed region 156), thereby continually compressing the resilient member (or clamp spring) 106 until the rotatable plate 417 has transitioned back to the non-extended position. As discussed above, when the rotatable plate 417 is in this position the resilient member (or clamp spring) 106 of the resilient coupling mechanism 102 has been compressed such that the first and second member (or clamp nuts) 108, 110 have been pushed down into the cavities 168, 284 of the embossed region 156, as shown in FIG. 4B.

As can be seen from the above discussion, the resilient coupling mechanism 102 of the resilient coupling mechanism assembly 100 provides an additional coupling point for at least a first portion of a portable electronic device 300. This additional coupling point provides additional support and rigidity to the portable electronic device. For example, when this first portion 301 of the device 300 is in an extended position, the moment of a force experienced by the first portion when the device is dropped, bumped, etc. is decreased by the resilient coupling mechanism 102. Therefore, less stress and force are exerted on the components of the device 300.

NON-LIMITING EXAMPLES

Although specific embodiments of the subject matter have been disclosed, those having ordinary skill in the art will understand that changes can be made to the specific embodiments without departing from the spirit and scope of the disclosed subject matter. The scope of the disclosure is not to be restricted, therefore, to the specific embodiments, and it is intended that the appended claims cover any and all such applications, modifications, and embodiments within the scope of the present disclosure.

What is claimed is:

1. A resilient coupling mechanism assembly comprising:
   outer portion
   a resilient member, the resilient member with at least an inner portion that is coupled to an outer portion , the outer portion circumscribing the inner portion;
   a first member coupled to the resilient member, the first member having a first cavity, a first portion and a second portion, the second portion extending from a first surface of the first portion, the first portion with a diameter that is larger than a diameter of the second portion, a second surface of the first portion being coupled to a first surface of the inner portion of the resilient member the first cavity extending from a first surface of the second portion to at least the first surface of the first portion;
   a vertical member disposed within the first cavity; and
   a second member coupled to the first member, the second member having a second cavity configured to receive the vertical member.

2. The resilient coupling mechanism of claim 1, the inner portion of the resilient member is coupled to the outer portion whereby an axial force in a first direction on the inner portion produces an axial force in a second direction by the outer portion.

3. The resilient coupling mechanism of claim 1, wherein the resilient member is formed from plastics, metals, metal alloys, composites, ceramics, or combinations thereof.

4. The resilient coupling mechanism of claim 1, the second member comprising a first portion and a second portion, the first and second portions being substantially circular, the first portion comprising a diameter that is larger than a diameter of the second portion, the second portion extending from a second surface of the first portion.

5. The resilient coupling mechanism assembly of claim 4, where at least a lower region of the second portion of the second member is disposed within the cavity of the first member.

6. The resilient coupling mechanism assembly of claim 1, wherein the resilient member is a spring.

7. The resilient coupling mechanism assembly of claim 1, further comprising:
   a base plate disposed above the resilient coupling mechanism.

8. The resilient coupling mechanism assembly of claim 7, where a first surface of the outer portion of the resilient member is coupled to a second surface of the base plate.

9. The resilient coupling mechanism assembly of claim 8, the base plate further comprising:
   an embossed region extending from a second surface of the base plate to an area above a first surface of the base plate.

10. The resilient coupling mechanism assembly of claim 9, the embossed region being disposed over the resilient coupling mechanism, where the embossed region comprises a diameter that is larger than a diameter of the resilient member of the resilient coupling mechanism.

11. The resilient coupling mechanism assembly of claim 9, the embossed region comprising a third cavity extending through a first portion of the embossed region into a fourth cavity disposed below a second surface of the first portion of the embossed region.

12. The resilient coupling mechanism assembly of claim 11, the third cavity comprising a diameter that is larger than a diameter of the second member of the resilient coupling mechanism, and smaller than a diameter of at least one portion of the first member of the resilient coupling mechanism.

13. The resilient coupling mechanism assembly of claim 11, the first member comprising a first portion and a second portion, the second portion extending from first surface of the first portion,
the second member comprising a first portion and a second portion, the second portion extending from a second surface of the first portion,
at least a region of the second portion of the first member of the resilient coupling mechanism extends into the third cavity, and at least the first portion of the second member of the resilient coupling mechanism extends above the first portion of the embossed region when the resilient member is in a relaxed state.

14. The resilient coupling mechanism assembly of claim 11, where the first member of the resilient coupling mechanism is disposed in the fourth cavity, and at least one portion of the second member of the resilient coupling mechanism is at least flush with the first portion of the embossed region when the resilient member is in a compressed state.

15. A portable electronic device comprising:
a first portion;
a second portion;
a resilient coupling mechanism assembly with:
a base plate coupled to the second portion, the base plate with a rotatable coupling mechanism, where the first portion is rotatably coupled to the second portion by the rotatable coupling mechanism, the rotatable coupling mechanism being a first coupling point between the first portion and the second portion, where a first member of the rotatable coupling mechanism is rotatably coupled to the first portion, and where a second member of the rotatable coupling mechanism is fixed to the second portion, where the first member rotates about the second member; and
a resilient coupling mechanism coupled to the base plate, the resilient coupling mechanism being a second coupling point between the first portion and the second portion, the resilient coupling mechanism with:
a resilient member;
a first member coupled to the resilient member, the first member having a first cavity;
a vertical member disposed within the first cavity; and
a second member coupled to the first member, the second member having a second cavity configured to receive the vertical member of the first member.

16. The portable electronic device of claim 15, where the first member of the rotatable coupling mechanism is rotatably coupled to a back portion of the first portion, and where the second member of the rotatable coupling mechanism is fixed to a front portion of the second portion, the back portion of the first portion facing the front portion of the second portion.

17. The portable electronic device of claim 15, the resilient member comprising at least an inner portion that is coupled to an outer portion, the outer portion circumscribing the inner portion, the first member comprising a first portion and a second portion, the second portion extending from a top surface of the first portion, the first portion comprising a diameter that is larger than a diameter of the second portion, a bottom surface of the first portion being coupled to a top surface of the inner portion of the resilient member, the first cavity extending from a top surface of the second portion to at least a top surface of the first portion.

18. The portable electronic device of claim 15, the second member comprising a first portion and a second portion, the first and second portions being substantially circular, the first portion comprising a diameter that is larger than a diameter of the second portion, the second portion extending from a bottom surface of the first portion.

19. The portable electronic device of claim 16, wherein the back portion of the first portion comprises:
a slotted area, the slotted area comprising:
a slot extending through a top surface of the back portion and a bottom surface of the back portion, the slot comprising a curved configuration; and
a tongued area comprising
a first end extending from a first end of the slot, and
a second end that is disposed opposite from the first end, the first end of the tongued area being coupled to the back portion, and the second end of the tongued area being free, the tongued area gradually increasing in slope from the first end to the second end.

20. The portable electronic device of claim 19, whereas the first portion rotates to an extended position with respect to the second portion, the resilient coupling mechanism encounters the slotted area, where a bottom surface of the tongued area contacts a top surface of the second member, the tongued area exerting a downward axial force on the second member in a direction towards the first member, where the first portion is perpendicular to the second portion when in the extended position.

21. The portable electronic device of claim 19, where a width between a first side and a second side of the slot is larger than a diameter of at least one portion of the second member of the resilient coupling mechanism, and where one end of the slot comprises a first inward extending portion and a second inward extending portion situated opposite the first inward extending portion, where a width between the first and second inward extending portions of the slot is smaller than the diameter of the at least one portion of the second member of the resilient coupling mechanism.

22. The portable electronic device of claim 21, where the at least one portion of the second member extends above the slot at a distance defined by the tongued area as the first portion rotates to an extended position with respect to the second portion.

23. The portable electronic device of claim 19, the slot further comprising:
a first side;
a second side disposed opposite the first side;
a first end; and
a second end,
the second end being disposed substantially near the second end of the tongued area, a width of the slot between the first side and the second side being larger than a width of the tongued area, the second end comprising a substantially curved region, the first side and the second side being coupled to the second end via a first inward extending portion and a second inward extending portion, the first and second inward extending portions being coupled to the curved region, where a width between the first and second inward extending portions is smaller than the width between the first and second sides of the slot.

24. The portable electronic device of claim 23, where at least one portion of the second member extends above the curved region of the second end of the slot when the first portion has rotated to an extended position that is perpendicular to the second portion, where a bottom surface of the at least one portion of the second member abuts a top surface of a back portion of the first portion, the at least one portion coupling the first portion to the second portion.

\* \* \* \* \*